(12) United States Patent
Cho

(10) Patent No.: US 8,648,697 B2
(45) Date of Patent: Feb. 11, 2014

(54) SYSTEM AND METHOD FOR INFORMATION SERVICE USING NETWORK

(75) Inventor: Young Bin Cho, Yongin-si (KR)

(73) Assignee: LG Innotek Co., Ltd., Seoul (KR)

( * ) Notice: Subject to any disclaimer, the term of this patent is extended or adjusted under 35 U.S.C. 154(b) by 357 days.

(21) Appl. No.: 12/740,280

(22) PCT Filed: Nov. 28, 2008

(86) PCT No.: PCT/KR2008/007072
§ 371 (c)(1),
(2), (4) Date: Apr. 28, 2010

(87) PCT Pub. No.: WO2009/069982
PCT Pub. Date: Jun. 4, 2009

(65) Prior Publication Data
US 2010/0231359 A1 Sep. 16, 2010

(30) Foreign Application Priority Data
Nov. 29, 2007 (KR) .................. 10-2007-0122416

(51) Int. Cl.
*H04Q 3/00* (2006.01)
*G08B 13/14* (2006.01)
*H04M 1/00* (2006.01)
*G06F 15/16* (2006.01)
*G06F 15/173* (2006.01)

(52) U.S. Cl.
USPC ... 340/10.1; 340/10.3; 340/572.1; 455/552.1; 455/553.1; 709/209; 709/238

(58) Field of Classification Search
USPC ........ 340/10; 455/552.1, 553.1; 709/209, 238
See application file for complete search history.

(56) References Cited

U.S. PATENT DOCUMENTS 6,369,705 B1 * 4/2002 Kennedy ................. 340/506
6,542,933 B1 * 4/2003 Durst et al. .............. 709/229
(Continued)

FOREIGN PATENT DOCUMENTS

EP 1555541 A2 7/2005
JP 2002-032046 A 1/2002
(Continued)

OTHER PUBLICATIONS

Office Action dated May 8, 2012 in Japanese Application No. 2010-535886, filed Nov. 28, 2008.
(Continued)

*Primary Examiner* — Daniel Wu
*Assistant Examiner* — Mohamed Barakat
(74) *Attorney, Agent, or Firm* — Saliwanchik, Lloyd & Eisenschenk

(57) ABSTRACT

Disclosed is an information providing system using a network. The information providing system comprises a tag for transmitting a tag identification code, a mobile communication terminal for receiving the tag identification code through a first network, generating map request data and transmitting the map request data together with the tag identification code, a first computer for transmitting the tag identification code and the map request data, which are received from the mobile communication terminal through a third network, through a second network, a third computer for providing map data through the second network, and a second computer for receiving the tag identification code and the map request data through the second network, receiving the map data from the third computer, and transmitting the map data to the first computer. The first computer transmits the map data to the mobile communication terminal through the third network.

14 Claims, 6 Drawing Sheets

(56) References Cited

U.S. PATENT DOCUMENTS

| | | | |
|---|---|---|---|
| 7,248,168 B2 * | 7/2007 | Muehl et al. | 340/572.4 |
| 7,352,999 B2 * | 4/2008 | Miettinen | 455/41.2 |
| 7,360,689 B2 * | 4/2008 | Beenau et al. | 235/380 |
| 7,463,151 B1 * | 12/2008 | Schulte-Kellinghaus | 340/572.1 |
| 7,606,533 B2 * | 10/2009 | Perttila et al. | 455/41.2 |
| 8,207,822 B2 * | 6/2012 | Agarwal et al. | 340/10.1 |
| 2003/0084021 A1 * | 5/2003 | Dweck et al. | 707/1 |
| 2004/0002305 A1 * | 1/2004 | Byman-Kivivuori et al. | 455/41.2 |
| 2005/0140507 A1 * | 6/2005 | Nam et al. | 340/539.13 |
| 2005/0253718 A1 | 11/2005 | Droms et al. | |
| 2006/0015254 A1 | 1/2006 | Smith | |
| 2006/0128408 A1 * | 6/2006 | Perttila et al. | 455/466 |

FOREIGN PATENT DOCUMENTS

| | | |
|---|---|---|
| JP | 2002-268993 A | 9/2002 |
| JP | 2005-032155 A | 2/2005 |
| JP | 2006-228174 A | 8/2006 |
| JP | 2007-147869 A | 6/2007 |
| JP | 2007-271391 A | 10/2007 |
| KR | 10-0757980 B1 | 9/2007 |

OTHER PUBLICATIONS

Supplementary European Search Report dated Dec. 20, 2012 in European Application No. 08854971.2, filed Nov. 28, 2008.
Notice of Allowance dated Sep. 17, 2013 in Japanese Application No. 2010-535886, filed Nov. 28, 2008.

* cited by examiner

SYSTEM AND METHOD FOR INFORMATION SERVICE USING NETWORK

CROSS-REFERENCE TO RELATED APPLICATIONS

This application is the U.S. national stage application of International Patent Application No. PCT/KR2008/007072, filed Nov. 28, 2008, which claims priority to Korean Application No. 10-2007-0122416, filed Nov. 29, 2007, the disclosures of each of which are incorporated herein by reference in their entirety.

TECHNICAL FIELD

The present disclosure relates to a system and a method for providing information by using a network.

BACKGROUND ART

With the development of communication technology, a service of supplying information to a user terminal by using a network has been provided. For example, a wireless Internet system provides information, such as news, stocks, games and advertisements, to a mobile communication terminal having mobile explorer by using a WAP (wireless application protocol).

According to a conventional information providing service, a service provider provides each user with same information. Thus, the users may receive unnecessary information as well as useful information, so that information may not be efficiently utilized.

Further, in the case of the unnecessary information, the users may not check the information. Thus, the effect of an advertisement provided together with the information may not be reduced.

DISCLOSURE OF INVENTION

Technical Problem

The embodiment provides a system and a method for providing information by using a network, which can provide useful information according to positions of a user.

The embodiment provides a system and a method for providing information by using a network, which can improve the effect of an advertisement.

Technical Solution

An information providing system using a network according to an embodiment comprises a tag for transmitting a tag identification code, a mobile communication terminal for receiving the tag identification code through a first network, generating map request data and transmitting the map request data together with the tag identification code, a first computer for transmitting the tag identification code and the map request data, which are received from the mobile communication terminal through a third network, through a second network, a third computer for providing map data through the second network, and a second computer for receiving the tag identification code and the map request data through the second network, receiving the map data from the third computer, and transmitting the map data to the first computer. The first computer transmits the map data to the mobile communication terminal through the third network.

An information providing method using a network according to an embodiment comprises the steps of transmitting a tag identification code by a tag, receiving the tag identification code through a first network by a mobile communication terminal, generating map request data and transmitting the map request data together with the tag identification code by the mobile communication terminal, transmitting the tag identification code and the map request data, which are received from the mobile communication terminal, to a second network by a first computer, receiving the tag identification code and the map request data through the second network, interpreting installation area information of the tag using the tag identification code, and requesting map data corresponding to the installation area information through the second network by a second computer, providing the map data, which is requested by the second computer, through the second network by a third computer, transmitting the map data to the first computer by the second computer, and transmitting the map data to the mobile communication terminal through the third network by the first computer.

Advantageous Effects

The embodiment can provide a system and a method for providing information by using a network, which can provide useful information according to positions of a user.

The embodiment can provide a system and a method for providing information by using a network, which can improve the effect of an advertisement.

BEST MODE FOR CARRYING OUT THE INVENTION

A system and a method for providing information by using a network according to an embodiment will be described in detail with reference to the accompanying drawings.

Figure 1:
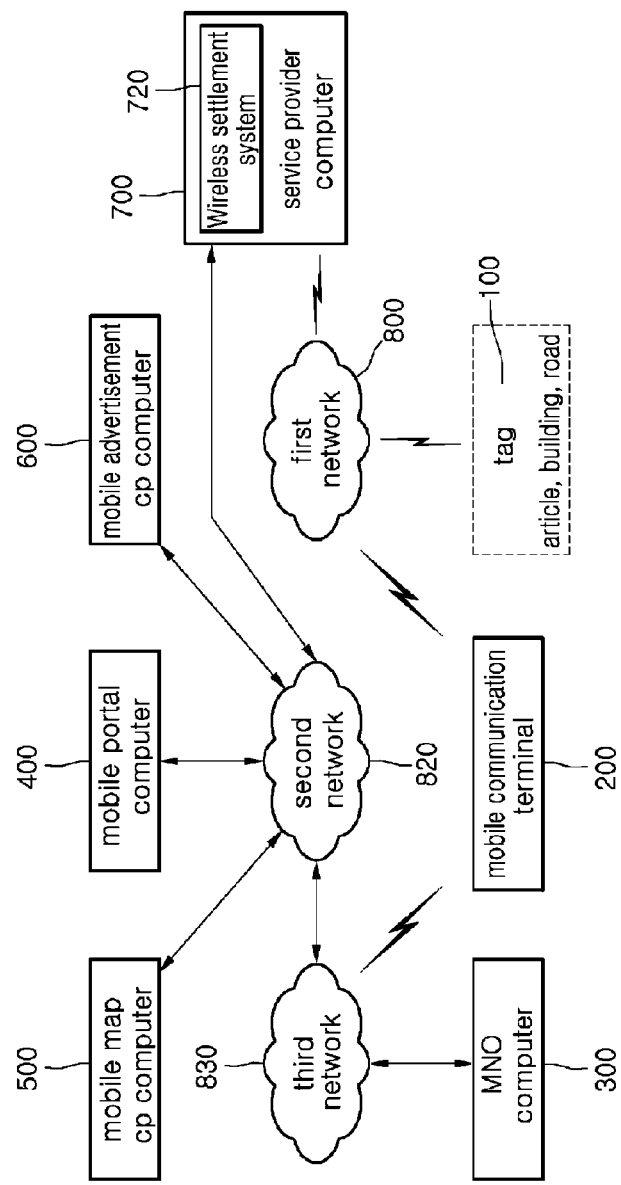
FIG. 1 is a block diagram illustrating an information providing system using a network according to an embodiment.

FIG. 1 is a block diagram illustrating the information providing system using the network according to an embodiment.

As illustrated in FIG. 1, the information providing system using the network according to the embodiment comprises a tag 100, a mobile communication terminal 200, a first computer 300 (hereinafter, referred to as mobile network operator computer), a second computer 400 (hereinafter, referred to as mobile portal computer), a third computer 500 (hereinafter, referred to as mobile map content provider computer), a fourth computer 600 (hereinafter, referred to as mobile advertisement content provider computer), and a service provider computer 700.

The mobile communication terminal 200 is connected with the service provider computer 700 having a wireless settlement system 720 and the tag 100 through a first network 800, and is connected with the mobile network operator computer 300 through a third network 830.

The mobile network operator computer 300 is connected with the mobile portal computer 400 and the mobile map content provider computer 500 through the third network 830.

The mobile map content provider computer 500 and the mobile portal computer 400 are interconnected through a second network 820, and the mobile advertisement content provider computer 600 and the service provider computer 700 are connected with the mobile portal computer 400 through the second network 820.

The tag 100 performs near field communication relative to a reader unit 210 (see FIG. 2) provided in the mobile communication terminal 200. The near field communication enables communication of about 900 MHz, RFID (radio frequency identification) communication and communication of about 13.56 MHz. The tag 100 transmits a tag identification code to the mobile communication terminal 200 in the form of a UID (unique identifier) code.

The tag 100 is fixed to a predetermined position to transmit the tag identification code. For example, the tag 100 may be installed on a road, a building or an article provided in the building. Thus, the tag 100 can be inserted into a protective housing and then buried in or attached to the ground or a wall surface.

The tag identification code transmitted from the tag 100 can be interpreted in the form of land registration information, geographic information, local information, installer information and the like. Thus, the tag 100 may be installed by a local government in order to manage the land registration information, or may be installed at a shop to advertise a service thereof.

The mobile communication terminal 200 comprises a cellular phone, a smart phone, a PDA (personal digital assistant), a notebook equipped with a wireless communication connection apparatus and the like. The mobile communication terminal 200 performs mobile communication relative to the mobile network operator computer 300 through the third network 830. The mobile communication terminal 200 performs short range wireless communication relative to the tag 100 or the service provider computer 700 through the first network 800. The first network 800 comprises an RFID communication network and the third network 830 comprises a CDMA (code division multiple access) mobile communication network.

The mobile communication terminal 200 comprises mobile explorer and can process a wireless application protocol or wireless Internet service such as an MMS (multimedia messaging service) or an SMS (short messaging service).

The mobile communication terminal 200 transmits the tag identification code, which is received through the first network 800, to the mobile portal computer 400 or the mobile map content provider computer 500 through the third network 830, thereby receiving the local information corresponding to the tag identification code.

The local information comprises various information such as LBS (location based service) information and GIS (geographic information service) information.

A location based service checks a position of a user by using a communication chip provided in a mobile communication terminal to provide the user with various services based on the corresponding position. The location based service comprises a cell-based service using a mobile telecommunication base station, a GPS (geographic positioning service) and the like. The embodiment uses short range wireless communication using the tag identification code.

A geographic information service provides information related to a map.

The information providing system according to the embodiment can provide the local information as described above. For example, the information providing system can provide a position tracking service capable of tracking positions of a friend, a missing person, a missing child, a vehicle and property. Further, the information providing system can also provide a public safety service, such as emergency notification, disaster alarm or rescue request, and local information such as vehicle navigation information, regional weather forecast information, sightseeing information, discount information, mobile yellow page information, sale analysis information or floating population forecast information.

The mobile communication terminal 200 transmits content data to the mobile portal computer 400 or the mobile map content provider computer 500 together with the tag identification code. Thus, the mobile communication terminal 200 can update the GIS and LBS information and share the content data through the third network 830.

For example, a mobile communication terminal user can take a photograph of a landscape in a sightseeing place where the tag 100 has been installed, and input sightseeing information, such as a view point for the sightseeing place or a famous restaurant, to the mobile communication terminal 200, thereby generating the content data. At this time, the mobile communication terminal 200 can receive the tag identification code from the tag 100 installed at the sightseeing place and then transmit the tag identification code to the mobile map content provider computer 500 or the mobile portal computer 400 together with the content data.

The mobile network operator computer 300 is a computer owned by a mobile communication network operator or a network lease operator and is used to manage the third network 830. The mobile network operator computer 300 bi-directionally transfers data among the mobile communication terminal 200, the mobile portal computer 400 and the mobile map content provider computer 500. The mobile network operator computer 300 can be prepared in the form of an MVNO (mobile virtual network operator) computer.

For example, the mobile network operator computer 300 comprises a WAP server, a WAP gateway, an MSC (mobile switching center), a BTS (base transceiver station), a BSC (base station controller), an HLR (home location register), an SMC (short message center) and an IWF (interworking function) to process wireless Internet data while interworking with the wired Internet.

The mobile portal computer 400 serves as a WAP server to manage a mobile webpage comprising local information. The mobile portal computer 400 can be installed together with the mobile network operator computer 300, so that a mobile communication operator can provide a mobile portal webpage service. According to the embodiment, the mobile network operator computer 300 and the mobile portal computer 400 are installed at places different from each other and managed by operators different from each other.

The mobile map content provider computer 500 serves as a WAP server to provide map data for defining a dynamic structure of geography and position-based local information. The mobile map content provider computer 500 can provide the map data to the mobile portal computer 400 through the second network 820 or to the mobile communication terminal 200 through the third network 830.

When the map data is provided to the mobile portal computer 400, the map data can be changed into various information combined with the local information and then provided to the mobile communication terminal 200. When the map data is directly provided to the mobile communication terminal 200, relatively simple map information is provided thereto. The map information provided to the mobile communication terminal 200 can be combined with content data uploaded by a user of the mobile communication terminal 200.

The mobile advertisement content provider computer 600 generates advertisement content of a service provider. According to the embodiment, the mobile advertisement content provider computer 600 is connected with the mobile portal computer 400 through the second network 820.

The service provider computer 700 is installed at a local government or a shop to provide public information related to regions or goods. The service provider computer 700 is connected with the mobile advertisement content provider computer 600 through the second network 820, and comprises the wireless settlement system 720. A user can perform mobile payment by using the mobile communication terminal 200. At this time, the wireless settlement system 720 processes wireless payment data. The service provider computer 700 can be managed by a person who wants to show an advertisement using the mobile advertisement content provider computer 600.

The second network 820 comprises a wireless network, such as a Wi-Fi, and a wired network such as an UART (universal asynchronous receiver/transmitter), the Internet (TCP/IP), a switch hub and a serial/parallel cable.

Figure 2:
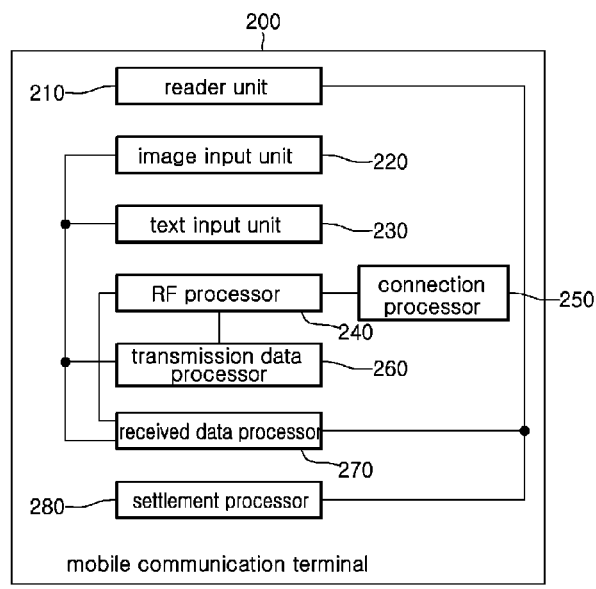
FIG. 2 is a block diagram illustrating a mobile communication terminal applied to an information providing system using a network according to the embodiment.

FIG. 2 is a block diagram illustrating the mobile communication terminal of the information providing system using the network according to the embodiment.

As illustrated in FIG. 2, the mobile communication terminal according to the embodiment comprises the reader unit 210, an image input unit 220, a text input unit 230, an RF processor 240, a connection processor 250, a transmission data processor 260 and a received data processor 270.

The received data processor 270 interworks with the mobile browser to display received local information, map data, advertisement data and content data on a mobile screen of the mobile communication terminal 200.

The received data processor 270 provides a user interface screen. The received data processor 270 transfers an operation signal to the reader unit 210 in a tag recognition mode or a payment mode.

The reader unit 210 performs communication relative to the tag 100 or the wireless settlement system 720 according to selection of a user. The reader unit 210 can be prepared as a reader capable of performing communication relative to an RFID tag, or an active tag capable of performing communication relative to an RFID reader.

The reader unit 210 converts the tag identification code received from the tag 100, or settlement request data received from the wireless settlement system 720 into interpretable digital data, and then transfers the digital data to the received data processor 270.

The image input unit 220 takes a photograph of a still image or a dynamic image. The image data obtained through the image input unit 220 can be used as the content data uploaded to the mobile portal computer 400.

The text input unit 230 allows a user to directly input region-related information such as information on a sightseeing place. The text information input through the text input unit 230 can be used as the content data.

The RF processor 240 converts an RF signal of the third network 830 (i.e. a mobile communication network) to a digital signal.

The connection processor 250 interprets the digital signal processed by the RF processor 240 to process a network access protocol.

The transmission data processor 260 interworks with the mobile browser to provide an interface device through which various data can be input using the image input unit 220 and the text input unit 230. The transmission data processor 260 generates content data having a mobile page format from collected data.

Accordingly, a user can generate content data, which comprises still pictures of famous sightseeing places, moving pictures, and text data such as epilogue or a story of one's experiences, by using the mobile communication terminal 200.

Hereinafter, the information providing method using the network according to the embodiment will be described with reference to FIGS. 3 to 9. For the purpose of convenience, the following description will be given on the assumption that a mobile communication terminal user has visited a sightseeing place and the tag 100 has been installed at facilities or a shop in a famous sightseeing place, and the service provider computer 700 has been installed at a shop.

Figure 3:
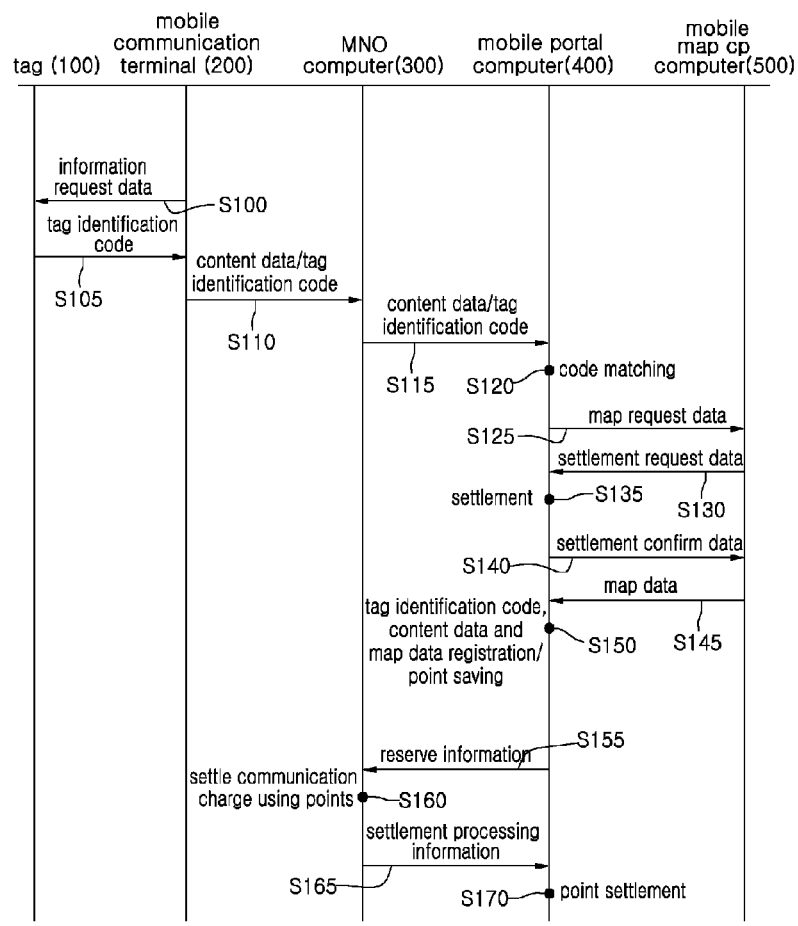
FIG. 3 is a flowchart illustrating data flow in a first case where content data is uploaded using a mobile communication terminal according to an information providing method using a network of an embodiment.

FIG. 3 is a flowchart illustrating data flow in a first case where the content data is uploaded using the mobile communication terminal according to the information providing method using the network of the embodiment. The content data is uploaded to the mobile portal computer 400.

A user operates the mobile communication terminal 200 to switch a mode of the mobile communication terminal 200 into a tag recognition mode while activating an operation of the reader unit 210.

The reader unit 210 transmits information request data to the tag 100 (S100) and the tag 100 transmits the tag identification code to the mobile communication terminal 200 (S105).

The mobile communication terminal 200 transmits the content data and the tag identification code to the mobile network operator computer 300 through the third network 830 (S110).

The mobile network operator computer 300 transmits the received content data and tag identification code to the mobile portal computer 400 through the second network 820 (S115). The mobile network operator computer 300 can identify an electrical serial number (ESN) of the mobile communication terminal 200, which is connected to the third network 830, to extract user registration information from a database, and provide the user registration information to the mobile portal computer 400.

If the content data and the tag identification code are received, the mobile portal computer 400 interprets the tag identification code to search for installation area information matching with the tag identification code (S120).

Then, the mobile portal computer 400 transmits map request data comprising the installation area information to the mobile map content provider computer 500 through the second network 820 (S125).

If the map request data is received, the mobile map content provider computer 500 transmits settlement request data to the mobile portal computer 400 (S130).

Upon receiving the settlement request data, the mobile portal computer 400 settles the service charge accompanied by the map supply service (S135).

The mobile portal computer 400 generates settlement confirm data and transmits the settlement confirm data to the mobile map content provider computer 500 (S140).

The mobile map content provider computer 500 extracts map data corresponding to the installation area information of the map request data to transmit the map data to the mobile portal computer 400 (S145). When the mobile portal computer 400 and the mobile map content provider computer 500 are managed by one operator, payment processing can be internally performed without data flow.

The mobile portal computer 400 generates single local information by matching the tag identification code, the map data and the content data with each other, and registers the local information in a database. The mobile portal computer 400 can reserve points for the user, who has provided the content data, by using the user registration information provided by the mobile network operator computer 300 in step 115 (S150).

Then, the mobile portal computer 400 transmits point reserve information to the mobile network operator computer 300 (S155), and the mobile network operator computer 300 performs settlement for the communication charge imposed to the mobile communication terminal 200, which accesses the third network 830 in order to upload the contents, by reducing the points reserved in step 150 (S160).

The mobile network operator computer 300 transmits settlement processing information on the communication charge to the mobile portal computer 400 (S165), and the mobile portal computer 400 performs the final settlement by reducing the initially reserved points (S170).

As described above, the mobile network operator computer 300 and the mobile portal computer 400 share the user registration information, the settlement processing information using points and the final settlement information. This is because the points can be used as payment means in the various elements.

Figure 4:
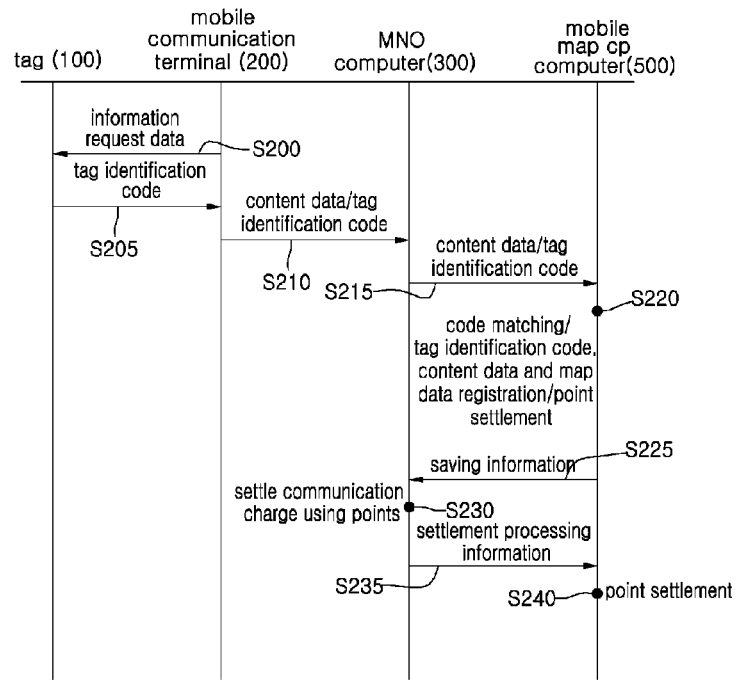
FIG. 4 is a flowchart illustrating data flow in a second case where content data is uploaded using a mobile communication terminal according to an information providing method using a network of an embodiment.

FIG. 4 is a flowchart illustrating data flow in a second case where the content data is uploaded using the mobile communication terminal according to the information providing method using the network of the embodiment. The content data is uploaded to the mobile map content provider computer 500.

The mobile map content provider computer 500 can provide map data combined with the content data generated by a user, instead of portal information provided by the mobile portal computer 400.

The reader unit 210 of the mobile communication terminal 200 transmits information request data to the tag 100 (S200) and the tag 100 transmits the tag identification code to the mobile communication terminal 200 (S205).

The mobile communication terminal 200 transmits the content data and the tag identification code to the mobile network operator computer 300 through the third network 830 (S210).

Then, the mobile network operator computer 300 transmits the content data and the tag identification code to the mobile map content provider computer 500 through the second network 820 (S215). At this time, the user registration information can also be transmitted to the mobile map content provider computer 500.

If the content data and the tag identification code are received, the mobile map content provider computer 500 interprets the tag identification code to match the tag identification code with the installation area information of the tag 100 and extracts map data corresponding to the installation area information.

If the map data is extracted, the mobile map content provider computer 500 generates single local information by matching the tag identification code, the map data and the content data with each other, and registers the local information in a database. Further, the mobile map content provider computer 500 reserves points for the user who has provided the content data (S220).

Then, the mobile map content provider computer 500 transmits point reserve information to the mobile network operator computer 300 (S225), and the mobile network operator computer 300 performs settlement by reducing communication charge of the mobile communication terminal 200 from the reserved points (S230).

The mobile network operator computer 300 transmits settlement processing information on the communication charge to the mobile map content provider computer 500 (S235), and the mobile map content provider computer 500 performs the final settlement by reducing the initially reserved points (S240).

The remaining points can be used later as a service charge when the mobile communication terminal 200 uses a local information service provided by the mobile map content provider computer 500.

Figure 5:
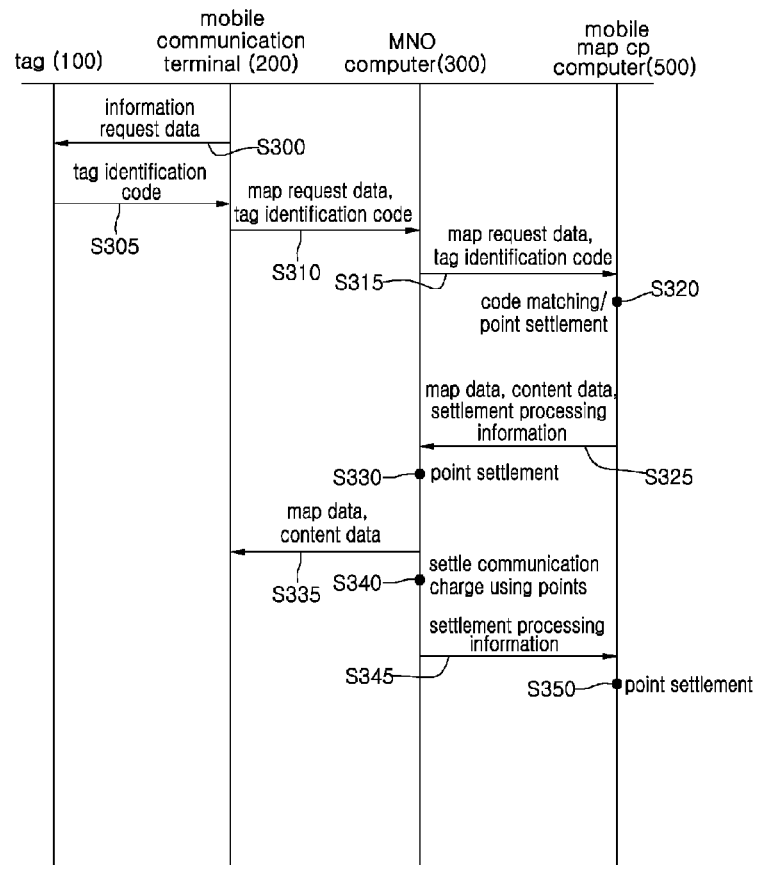
FIG. 5 is a flowchart illustrating data flow in a case where map information is provide to a mobile communication terminal according to an information providing method using a network of an embodiment.

FIG. 5 is a flowchart illustrating data flow in a case where map information is provided to the mobile communication terminal according to the information providing method using the network of the embodiment. FIG. 5 shows a case where the mobile communication terminal 200 uploads the content data to the mobile map content provider computer 500 and then uses the content data and map information collected by the mobile map content provider computer 500.

The reader unit 210 of the mobile communication terminal 200 transmits the information request data to the tag 100 (S300) and the tag 100 transmits the tag identification code to the mobile communication terminal 200 (S305).

The mobile communication terminal 200 transmits map request data and the tag identification code to the mobile network operator computer 300 through the third network 830 (S310).

The mobile network operator computer 300 transmits the received map request data and tag identification code to the mobile map content provider computer 500 through the second network 820 (S315). At this time, the user registration information can also be transmitted to the mobile map content provider computer 500.

If the map request data and the tag identification code are received, the mobile map content provider computer 500 interprets the tag identification code to match the tag identification code with the installation area information of the tag 100 and extracts map data and content data corresponding to the installation area information. Further, the mobile map content provider computer 500 checks the user registration information and performs settlement for information service charge by reducing points of a user (S320).

The mobile map content provider computer 500 transmits the extracted map data and content data and settlement processing information about the points to the mobile network operator computer 300 (S325).

The mobile network operator computer 300 settles the points based on the settlement processing information (S330) and transmits the map data and the content data to the mobile communication terminal 200 (S335).

The mobile network operator computer 300 performs settlement for the communication charge of the mobile communication terminal 200 by using the points (S340) and transmits settlement processing information to the mobile map content provider computer 500 (S345).

Finally, the mobile map content provider computer 500 performs settlement by reducing the points of the mobile communication terminal 200 (S350).

Thus, a user visiting a sightseeing place can check a position of the user on a map by using the mobile communication terminal 200 and check the content data.

Figure 6:
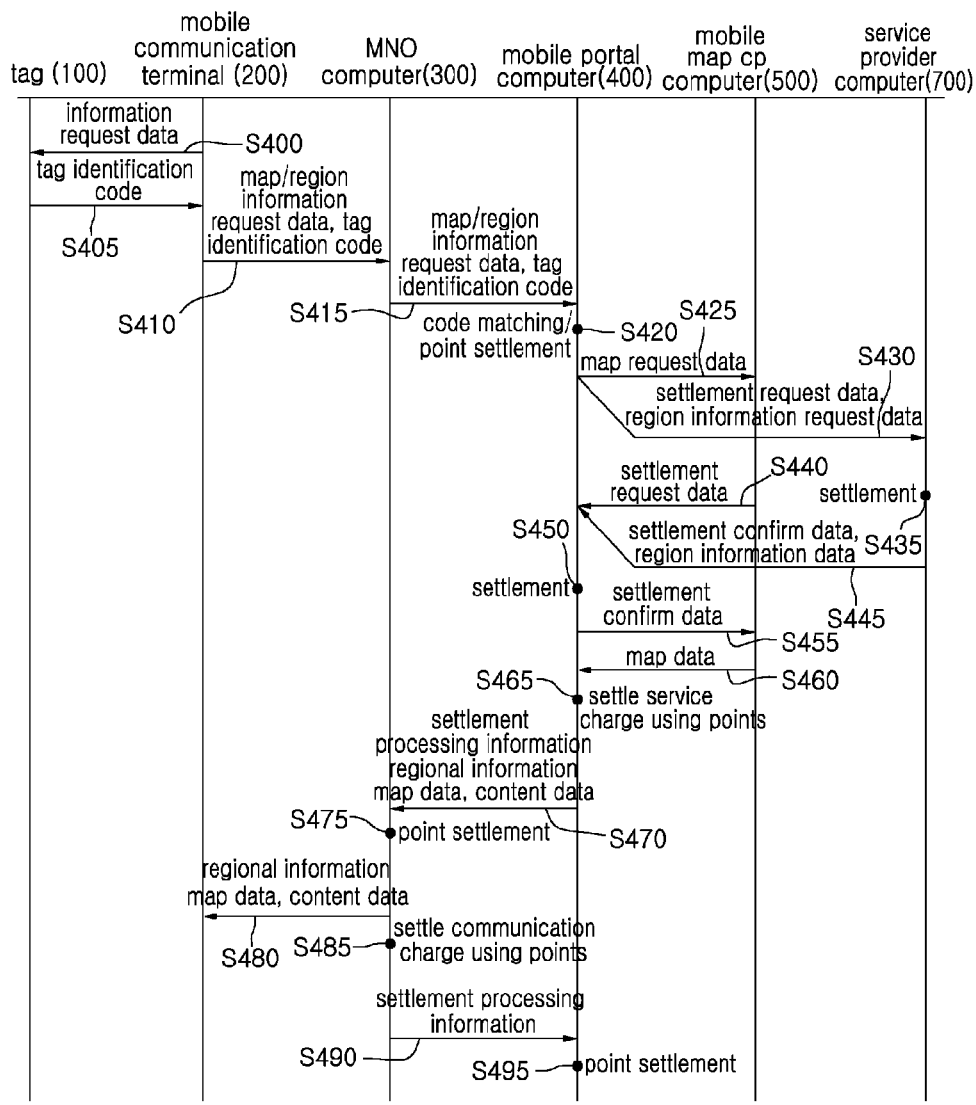
FIG. 6 is a flowchart illustrating data flow in a case where local information is provided to a mobile communication terminal according to an information providing method using a network of an embodiment.

FIG. 6 is a flowchart illustrating data flow in a case where the local information is provided to the mobile communication terminal according to the information providing method using the network of the embodiment.

The reader unit 210 of the mobile communication terminal 200 transmits the information request data to the tag 100 (S400) and the tag 100 transmits the tag identification code to the mobile communication terminal 200 (S405).

The mobile communication terminal 200 transmits local information request data, the map request data and the tag identification code to the mobile network operator computer 300 through the third network 830 (S410).

If the mobile network operator computer 300 confirms that the local information request data is comprised in the received data, the mobile network operator computer 300 sets the mobile portal computer 400 as a data transfer path. The mobile network operator computer 300 transmits the local information request data, the map request data and the tag identification code to the mobile portal computer 400 (S415). At this time, the user registration information can also be transmitted to the mobile portal computer 400.

If the local information request data, the map request data and the tag identification code are received, the mobile portal computer 400 interprets the tag identification code to match the tag identification code with the installation area information of the tag 100 and performs settlement for the information service charge of the mobile communication terminal 200 by using the points (S420).

The mobile portal computer 400 transmits the map request data comprising the installation area information to the mobile map content provider computer 500 (S425), and transmits the local information request data comprising the installation area information and the settlement request data to the service provider computer 700 (S430).

The local information provided by the service provider computer 700 comprises advertisement/public information. The mobile portal computer 400 receives the fee for advertisement from the service provider computer 700. The settlement request data transmitted from the mobile portal computer 400 to the service provider computer 700 is used for requesting settlement of the fee for the advertisement.

The fee is processed in cash instead of points, and a point settlement concept can be introduced through such a profit structure. In detail, the mobile portal computer 400 can substitute the profit obtained from an advertiser into points such that the points can be used for data processing cost used in each element. Through the above settlement scheme, the service provider can efficiently induce the users to use the services.

If the settlement request data is received, the service provider computer 700 performs settlement charge for publicity work for the local information (S435) and transmits settlement confirm data and local information data corresponding to the installation area information to the mobile portal computer 400 (S445).

The mobile map content provider computer 500 transmits the settlement request data accompanied with supply of the map data to the mobile portal computer 400 (S440). Then, the mobile portal computer 400 performs settlement charge accompanied with supply of a mobile map (S450) and then transmits settlement confirm data to the mobile map content provider computer 500 (S455).

After the settlement confirm data is received, the mobile map content provider computer 500 extracts map data corresponding to the installation area information of the tag 100 comprised in the map request data, and transmits the map data to the mobile portal computer 400 (S460).

The mobile portal computer 400 transmits the settlement processing information about the points of the mobile communication terminal 200, the local information, the map data and the content data to the mobile network operator computer 300 (S470). The content data comprises multimedia data directly uploaded to the mobile portal computer 400 by a user of the mobile communication terminal 200, or normal portal information managed by the mobile portal computer 400 as a database. In such a case, the mobile portal computer 400 can search for portal information corresponding to the installation area information of the tag 100 from the database, and then change the portal information into the content data.

The mobile network operator computer 300 performs settlement for points registered in the user registration information of the mobile communication terminal 200 based on the settlement processing information received from the mobile portal computer 400 (S475), and then transfers the local information, the map data and the content data to the mobile communication terminal 200 (S480).

The mobile network operator computer 300 settles the service charge, which is imposed to the mobile communication terminal 200 having used the third network 830, by using the points (S485), and then transfers settlement processing information to the mobile portal computer 400.

The mobile portal computer 400 performs settlement for the points based on the shared settlement processing information (S495), and then prevents the reserved pointed from being abnormally used when a user uses the service.

In step 480, the mobile browser of the mobile communication terminal 200 can display the local information, the map data and the content data on a single screen of the mobile communication terminal 200.

In this manner, the mobile communication terminal 200 can display pictures comprising a map of a region where the tag 100 is installed and a landscape of the region, which is photographed and uploaded by a user. Further, the mobile communication terminal 200 can display local information on an address of the region, a recommended famous sightseeing place and the like.

Figure 7:
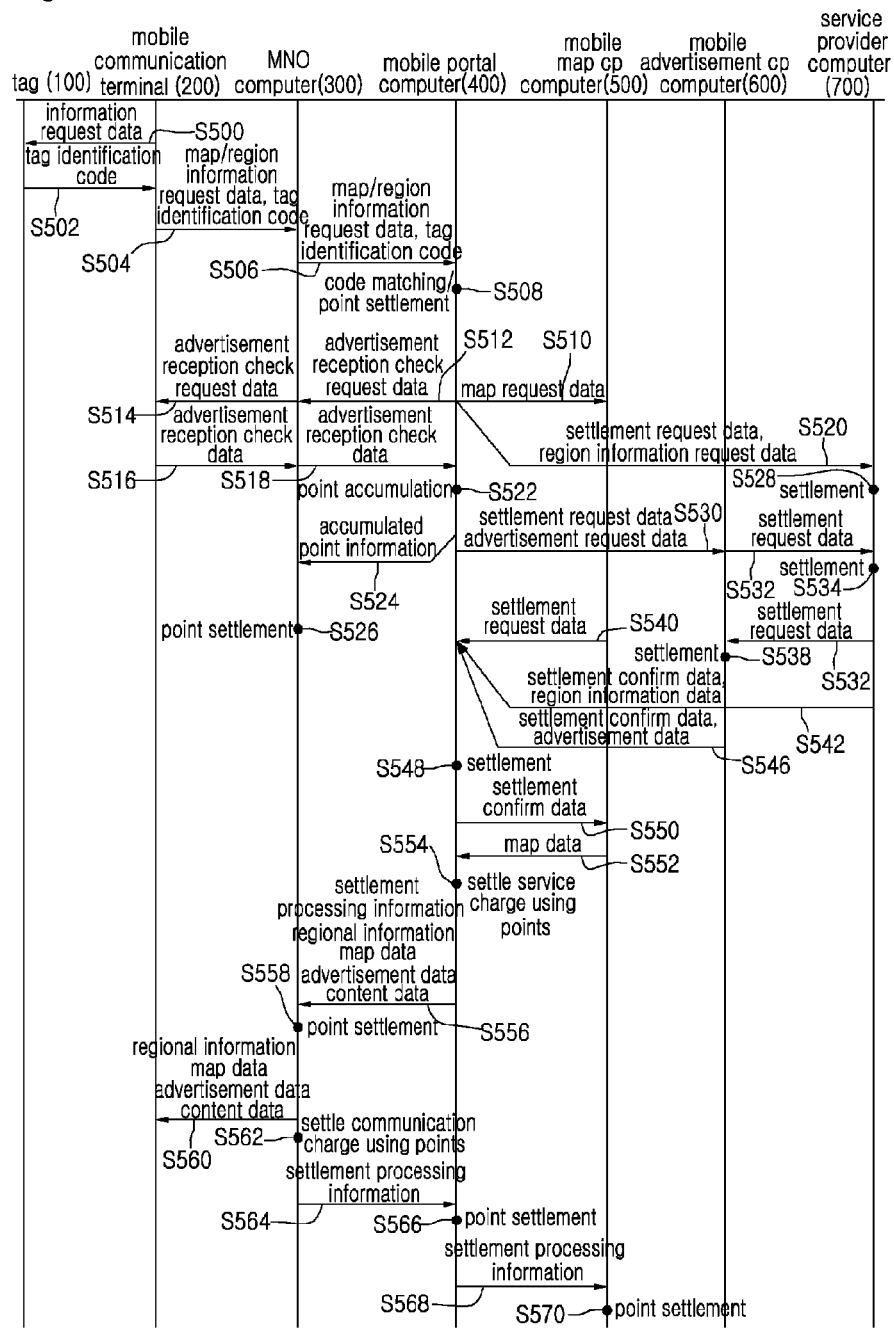
FIG. 7 is a flowchart illustrating data flow in a case where local information and advertisement information are provided through a mobile communication terminal according to an information providing method using a network of an embodiment.

FIG. 7 is a flowchart illustrating data flow in a case where local information and advertisement information are provided through the mobile communication terminal according to the information providing method using the network of the embodiment.

The reader unit 210 of the mobile communication terminal 200 transmits the information request data to the tag 100 (S500) and the tag 100 transmits the tag identification code to the mobile communication terminal 200 (S502).

The mobile communication terminal 200 transmits the local information request data, the map request data and the tag identification code to the mobile network operator computer 300 through the third network 830 (S504).

If the mobile network operator computer 300 checks that the local information request data is comprised in the received data, the mobile network operator computer 300 sets the mobile portal computer 400 a data transfer path. The mobile network operator computer 300 transmits the local information request data, the map request data and the tag identification code to the mobile portal computer 400 (S506). At this time, the user registration information can also be transmitted to the mobile portal computer 400.

If the local information request data, the map request data and the tag identification code are received, the mobile portal computer 400 interprets the tag identification code to match the tag identification code with the installation area information of the tag 100 and settles the information service charge of the mobile communication terminal 200 by using the points (S508).

The mobile portal computer 400 determines if there exists advertisement data requested by a person who runs a shop in the region where the tag 100 is installed. In detail, the person can upload local information using the service provider computer 700 and has requested a manager (e.g. advertising agent) of the mobile advertisement content provider computer 600 to produce an advertisement, and the mobile advertisement content provider computer 600 comprises advertisement data created according to the request. Further, the shop manager has requested a manager of the mobile portal computer 400 to provide an advertisement to a user of the mobile communication terminal 200 having visited a mobile portal site.

After the service charge of the mobile communication terminal 200 is settled using the points (S508), the mobile portal computer 400 transfers advertisement reception confirm request data to the mobile network operator computer 300 (S512), and the mobile network operator computer 300 transfers the advertisement reception confirm request data to the mobile communication terminal 200 (S514).

Meanwhile, the mobile portal computer 400 transmits the map request date comprising the installation area information to the mobile map content provider computer 500 (S510), and transmits the local information request data comprising the installation area information and the settlement request data to the service provider computer 700 (S520).

The service provider computer 700 settles the fee for publicity work for the local information (S528).

Meanwhile, the advertisement reception confirm request data transferred to the mobile communication terminal 200 can be displayed through a message window for checking whether to receive an advertisement. A user can respond to the message window by operating a keypad and transmit advertisement reception confirm data to the mobile network operator computer 300 (S516).

The advertisement reception confirm data is transferred to the mobile portal computer 400 via the mobile network operator computer 300 (S518).

If a user determines to see the advertisement, the mobile portal computer 400 accumulates points of the corresponding user (S522) and transmits point accumulation information to the mobile network operator computer 300 to allow changed point information to be shared therebetween (S524).

Accordingly, the mobile network operator computer 300 performs settlements for the points based on the point accumulation information (S526).

Then, the mobile portal computer 400 transfers the settlement request data and advertisement request data to the mobile advertisement content provider computer 600 (S530).

Upon receiving the settlement request data, the mobile advertisement content provider computer 600 transmits the settlement request data to the service provider computer 700 of the shop manager who has requested the advertisement production (S532). At this time, the settlement request data represents payment request imposed to an advertisement receiver accompanied with supply of the advertisement data to the mobile portal computer 400.

The service provider computer 700 performs settlement based on the settlement request data transferred from the mobile advertisement content provider computer 600 (S534), and transfers settlement confirm data to the mobile advertisement content provider computer 600 (S532).

Upon receiving the settlement confirm data, the mobile advertisement content provider computer 600 performs settlement in response to the settlement request data (see S530) transmitted from the mobile portal computer 400 (S538), and transmits settlement confirm data and advertisement data to the mobile portal computer 400 (S546).

Meanwhile, after performing p settlement based on the local information request data (S528), the service provider computer 700 transmits settlement confirm data and local information data to the mobile portal computer 400 (S542).

Upon receiving the map request data (S510), the mobile map content provider computer 500 transmits the settlement request data to the mobile portal computer 400 (S540). The mobile portal computer 400 settles the charge accompanied with the map supply (S548).

The mobile portal computer 400 transmits the settlement confirm data to the mobile map content provider computer 500 (S550), and the mobile map content provider computer 500 transmits the map data to the mobile portal computer 400 (S552).

Then, the mobile portal computer 400 transmits the settlement processing information (see S508) of the mobile communication terminal 200, the local information, the map data, the advertisement data and the content data to the mobile network operator computer 300 (S556).

The mobile network operator computer 300 performs settlement for the points of a user, which is managed by the mobile network operator computer 300, based on the received settlement processing information (S558).

The mobile network operator computer 300 transmits the local information, the map data, the advertisement data and the content data to the mobile communication terminal 200 (S560), and the mobile browser of the mobile communication terminal 200 displays the received local information, map data, advertisement data and content data in the form of single information.

Further, the mobile network operator computer 300 performs settlement for the communication service charge of the mobile communication terminal 200 by using the user points (S562), and transmits settlement processing information to the mobile portal computer 400 (S564).

The mobile portal computer 400 settles the points of a user, which is managed by the mobile portal computer 400, according to the received settlement processing information (S566), and transmits the settlement processing information, which is received from the mobile network operator computer 300, to the mobile map content provider computer 500 (S568).

Finally, the mobile map content provider computer 500 performs settlement for the points of a user, which is managed by the mobile map content provider computer 500, according to the received settlement processing information (S570).

As described above, the points of the user settled by the mobile portal computer 400 or the mobile map content provider computer 500 can be continuously used when a user uses map information or local information.

Figure 8:
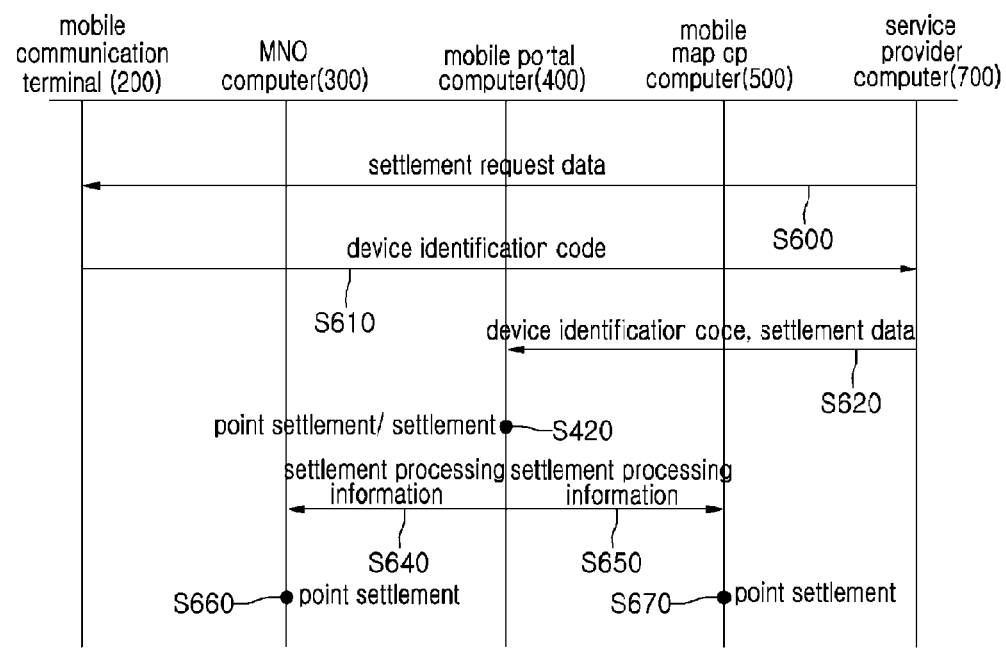
FIG. 8 is a flowchart illustrating data flow in a case where a user pays a purchasing price for goods by using a mobile communication terminal according to an information providing method using a network of an embodiment.

FIG. 8 is a flowchart illustrating data flow in a case where a user performs settlement for a purchasing price for goods by using the mobile communication terminal according to the information providing method using the network of the embodiment.

The service provider computer 700 comprises the wireless settlement system 720 prepared in the form of an RFID reader. Accordingly, if a user purchases goods, a seller inputs the price for the goods to the wireless settlement system 720. Then, the service provider computer 700 transmits settlement request data to the mobile communication terminal 200 (S600).

If a user sets a payment mode in the reader unit 210 of the mobile communication terminal 200, the mobile communication terminal 200 transmits an electrical serial number to the wireless settlement system 720 of the service provider computer 700 having transmitted the settlement request data (S610).

Then, the service provider computer 700 transmits the electrical serial number and settlement data comprising settlement information to the mobile portal computer 400 (S620). In a case in which a user visits a shop with reference to advertisement information or local information, the service provider computer 700 can transmit discounted settlement data.

The mobile portal computer 400 checks a registered user based on the electrical serial number. Further, the mobile portal computer 400 performs settlement for the points of the corresponding user based on the settlement data (S420).

The mobile portal computer 400 transmits settlement processing information about the points to the mobile network operator computer 300 and the mobile map content provider computer 500 (S640 and S650).

The mobile network operator computer 300 and the mobile map content provider computer 500 perform settlement for the points of corresponding users, who are managed by the mobile network operator computer 300 and the mobile map content provider computer 500, according to the received settlement processing information (S660 and S670).

In such a case, the mobile portal computer 400 may serve as a system that provides a settlement agency service, and points used for the settlement can be used when a user uploads content data or acquires advertisement information.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The embodiment can be used for providing a user with information by using a network.

The invention claimed is:

1. An information providing system using a network, the information providing system comprising:
a tag for transmitting a tag identification code;
a mobile communication terminal for receiving the tag identification code through a first network, generating map request data by the mobile communication terminal and transmitting the map request data together with the tag identification code through a third network;
a mobile network operator computer for transmitting the tag identification code and the map request data, which are received from the mobile communication terminal through the third network, through a second network, wherein the mobile network operator computer manages the third network;
a mobile map content provider computer for providing map data through the second network, wherein the mobile map content provider computer provides map data for defining a dynamic structure of geography and position-based local information; and
a mobile portal computer for receiving the tag identification code and the map request data from the mobile network operator computer through the second network, receiving the map data from the mobile map content provider computer, and transmitting the map data to the mobile network operator computer, wherein the mobile portal computer manages a mobile webpage comprising local information,
wherein the mobile network operator computer transmits the map data to the mobile communication terminal through the third network,
wherein the information providing system further comprises a service provider computer for providing local information through the second network,
wherein, upon receiving local information request data from the mobile communication terminal through the third network, the mobile portal computer receives local information, which corresponds to the installation area information of the tag interpreted using the tag identification code, from the service provider computer, and transmits the local information to the mobile network operator computer together with the map data,
wherein the service provider computer comprises a wireless settlement system for receiving an electrical serial number from the mobile communication terminal connected through the first network and performing settlement for article purchase, and
transmitting the electrical serial number and settlement data to the mobile portal computer, and
wherein the mobile portal computer performs settlement for points, which are reserved for a register of the mobile communication terminal, based on the settlement data.

2. The information providing system as claimed in claim 1, wherein the map data comprises installation area information of the tag interpreted using the tag identification code, and the mobile map content provider computer searches for content data corresponding to the installation area information and transmits the content data to the mobile network operator computer together with the map data.

3. The information providing system as claimed in claim 1, comprising a mobile advertisement content provider computer for providing advertisement data through the second network,
and wherein, upon receiving advertisement reception confirm data from the mobile communication terminal through the third network, the mobile portal computer receives the advertisement data, which corresponds to the installation area information of the tag interpreted using the tag identification code, from the mobile advertisement content provider computer and transmits the advertisement data to the mobile network operator computer together with the map data.

4. The information providing system as claimed in claim 1, wherein the first network is a short range wireless communication network comprising at least one of radio frequency identification (RFID) and near field communication (NFC), and the mobile communication terminal comprises a reader unit that performs short range wireless communication relative to the tag.

5. The information providing system as claimed in claim 1, wherein the second network is a wired/wireless network comprising at least one of a wireless local area network, a universal asynchronous receiver/transmitter (UART), a TCP/IP, a switch hub and a serial/parallel cable.

6. The information providing system as claimed in claim 1, wherein the third network is a mobile communication network comprising at least one of a gateway, a base transceiver station (BTS) and an interworking function (IWF).

7. An information providing method using a network, the information providing method comprising the steps of:
   transmitting a tag identification code by a tag;
   receiving the tag identification code through a first network by a mobile communication terminal;
   generating map request data and transmitting the map request data together with the tag identification code to a third network by the mobile communication terminal;
   transmitting the tag identification code and the map request data, which are received from the mobile communication terminal, to a second network by a mobile network operator computer, wherein the mobile network operator computer manages the third network;
   receiving the tag identification code and the map request data through the second network by a mobile portal computer, interpreting installation area information of the tag using the tag identification code, and requesting map data corresponding to the installation area information through the second network, wherein the mobile portal computer manages a mobile webpage comprising local information;
   providing the map data, which is requested by the mobile portal computer, to the mobile portal computer through the second network by a mobile map content provider computer, wherein the mobile map content provider computer provides map data for defining a dynamic structure of geography and position-based local information;
   transmitting the map data to the mobile network operator computer by the mobile portal computer; and
   transmitting the map data to the mobile communication terminal through the third network by the mobile network operator computer,
   wherein, upon receiving local information request data from the mobile communication terminal through the third network, the mobile portal computer receives local information, which corresponds to the installation area information of the tag interpreted using the tag identification code, from a service provider computer, and transmits the local information to the mobile network operator computer together with the map data,
   wherein the service provider computer comprises a wireless settlement system for receiving an electrical serial number from the mobile communication terminal connected through the first network and performing settlement for article purchase, and
   transmitting the electrical serial number and settlement data to the mobile portal computer, and
   wherein the mobile portal computer performs settlement for points, which are reserved for a register of the mobile communication terminal, based on the settlement data.

8. The information providing method as claimed in claim 7, wherein the mobile map content provider computer searches for content data corresponding to the installation area information and transmits the content data to the mobile network operator computer together with the map data.

9. The information providing method as claimed in claim 7, comprising the steps of:
   requesting advertisement reception confirm data through the third network by the mobile communication terminal; and
   receiving the advertisement reception confirm data from the mobile communication terminal by the mobile portal computer, receiving advertisement data, which corresponds to the installation area information, from a mobile advertisement content provider computer, and transmitting the advertisement data to the mobile network operator computer together with the map data.

10. The information providing method as claimed in claim 7, comprising the steps of:
    transmitting the tag identification code and content data to the third network by the mobile communication terminal;
    transmitting the tag identification code and the content data, which are received from the mobile communication terminal, to the second network by the mobile network operator computer;
    receiving the tag identification code and the content data through the second network by the mobile portal computer, interpreting the installation area information of the tag using the tag identification code, and requesting map data corresponding to the installation area information through the second network;
    providing the map data, which is requested by the mobile portal computer, through the second network by the mobile map content provider computer; and
    receiving the map data and storing the map data and the content data by the mobile portal computer.

11. The information providing method as claimed in claim 10, wherein the mobile portal computer reserves points for a register of the mobile communication terminal storing the content data.

12. The information providing method as claimed in claim 7, comprising the steps of:
    transmitting the tag identification code and content data to the third network by the mobile communication terminal;
    transmitting the tag identification code and the content data, which are received from the mobile communication terminal, to the second network by the mobile network operator computer;
    receiving the tag identification code and the content data through the second network by the mobile map content provider computer, extracting map data corresponding to the installation area information of the tag using the tag identification code, storing the map data and the content data, and reserving points for a register of the mobile communication terminal storing the content data.

13. An information providing method using a network, the information providing method comprising:
    generating content data using a mobile communication terminal;
    receiving a tag identification code from a tag being installed at a place where the content data is generated;
    transmitting the generated content data with the received tag identification code to any one of a mobile map content provider computer or a mobile portal computer through a third network, a mobile network operator computer and a second network, wherein the mobile map content provider computer provides map data for defining a dynamic structure of geography and position-based local information, wherein the mobile portal computer manages a mobile webpage comprising local information, wherein the mobile network operator computer manages the third network;

searching for an installation area information being matched through interpreting the received tag identification code if the content data and the tag identification code are received in the mobile portal computer;

transmitting map request data corresponding to the installation area information being matched, by the mobile portal computer, to the mobile map content provider computer through the second network;

extracting map data corresponding to the installation area information of the map request data by the mobile map content provider computer and transmitting the extracted map data to the mobile portal computer; and matching the tag identification code, the map data, and the content data with each other by the mobile portal computer, generating a local information and registering the local information in a database, wherein, upon receiving local information request data from the mobile communication terminal through the third network, the mobile portal computer receives local information, which corresponds to the installation area information of the tag interpreted using the tag identification code, from a service provider computer, and transmits the local information to the mobile network operator computer together with the map data, wherein the service provider computer comprises a wireless settlement system for receiving an electrical serial number from the mobile communication terminal connected through the first network and performing settlement for article purchase, and transmitting the electrical serial number and settlement data to the mobile portal computer, and wherein the mobile portal computer performs settlement for points, which are reserved for a register of the mobile communication terminal, based on the settlement data.

14. An information providing method using a network, the information providing method comprising:

generating content data using a mobile communication terminal;

transmitting information request data to a tag, by a reader of a mobile communication terminal, and transmitting a tag identification code by the tag;

transmitting the generated content data with the received tag identification code to a mobile map content provider computer through a third network, a mobile network operator computer and a second network, wherein the mobile network operator computer manages the third network;

interpreting the tag identification code to match the tag identification code with installation area information of the tag and extracting map data corresponding to the installation area information if the content data and the tag identification code are received in the mobile map content provider computer, wherein the mobile map content provider computer provides map data for defining a dynamic structure of geography and position-based local information; and matching the tag identification code, the map data, and the content data with each other by the mobile map content provider computer if the map data is extracted, generating a local information and registering the local information in a database, wherein, upon receiving local information request data from the mobile communication terminal through the third network, a mobile portal computer receives local information, which corresponds to the installation area information of the tag interpreted using the tag identification code, from a service provider computer, and transmits the local information to the mobile network operator computer together with the map data, wherein the service provider computer comprises a wireless settlement system for receiving an electrical serial number from the mobile communication terminal connected through the first network and performing settlement for article purchase, and transmitting the electrical serial number and settlement data to the mobile portal computer, and wherein the mobile portal computer performs settlement for points, which are reserved for a register of the mobile communication terminal, based on the settlement data.

* * * * *